UNITED STATES PATENT OFFICE.

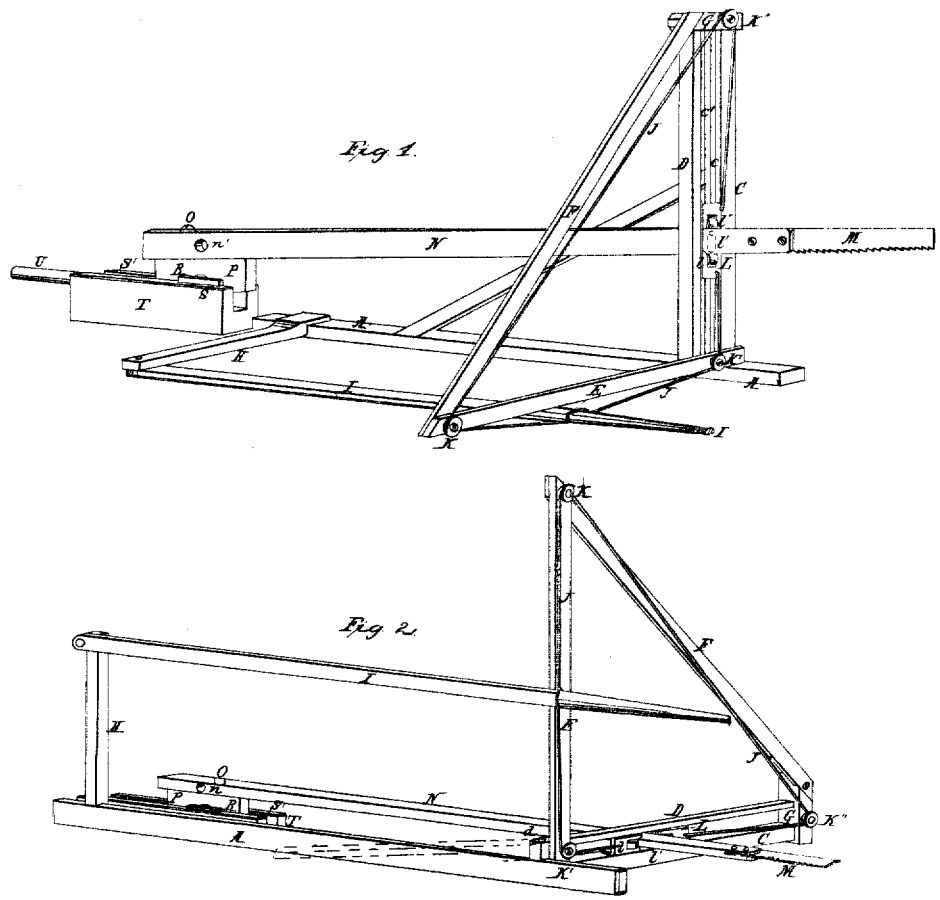

CHARLES R. WARNER AND MOSES BALES, OF LONDON, OHIO.

IMPROVEMENT IN SAWING-MACHINES.

Specification forming part of Letters Patent No. 58,921, dated October 16, 1866.

*To all whom it may concern:*

Be it known that we, CHARLES R. WARNER and MOSES BALES, both of London, Madison county, State of Ohio, have invented certain new and useful Improvements in Crosscut-Sawing Machines; and we do hereby declare the following to be a full, clear, and exact description thereof, reference being had to the accompanying drawings, making part of this specification.

This improvement relates to that class of portable sawing-machines which are principally employed by farmers and other limited operators; and our invention consists in a novel arrangement of mechanical devices to permit of the saw being operated either in a vertical or in a horizontal plane, by which means trees can be felled and then cut up into suitable lengths for rails, fire-wood, building materials, &c., by the use of only one machine.

Figure 1 is a perspective view of a crosscut-sawing machine embodying our improvements, it being represented in a position for operating on fallen timber. Fig. 2 represents the same machine when placed in a proper position for cutting down trees, stumps, &c.

A is the main frame or foundation of the machine, to which there is attached a vertical standard, consisting of the fixed post C and movable one, D, the latter being pivoted to the frame A at $d$.

Attached to the bottom of the post D, and projecting at right angles from it, is a beam, E, to whose outer end is secured a brace, F, which is connected to the block G, and the free end of the movable post D is connected to said block by a suitable pin or bolt, which can be readily withdrawn when desired.

Projecting from the rear end of the frame A is another short beam, H, parallel to the one E, and said beam H serves as a fulcrum for the lever I, the latter having connected to it an endless rope or chain, J, which passes around the rollers K K' K''.

The ends of the rope J are attached to the shiftable rest L, which is provided with three anti-friction rollers, $l\ l'\ l''$, and said shiftable rest is confined to a rectilinear path by means of the guides $c\ c'$, which are attached to the fixed post, C.

The rollers $l\ l'$ sustain the saw-shaft N when the latter is operated in a vertical plane, while the roller $l''$ supports it in a horizontal position.

The saw M is securely attached to the free end of the saw-shaft N, and the fixed end of the latter is provided with two openings, $n\ n'$, for the reception of a bolt, O, by which the saw-shaft is connected to the vibratory block P.

The block P is pivoted to the cross-head R in such a manner as to permit of its vibrating in a vertical plane, and the cross-head R is confined to a rectilinear path by the guides S S', which are attached to a suitable bed-plate, T.

The cross-head R is connected to a piston, U, which may be driven by any convenient power.

Operation: It being desired to cut up timber which has been felled, the machine is placed in the position shown in Fig. 1, and when thus arranged the bolt O is passed through the opening $n$ of the saw-shaft N. A reciprocating motion being imparted to the saw M by the piston U and cross-head R, vibrating block P, and shaft N, the saw is then forced into the log by means of the operator moving the lever I from the frame A, and it is withdrawn from the log by simply reversing the motion of said lever.

Whenever it is desired to saw down trees, stumps, &c., the frame A is turned over on its side, as shown in Fig. 2, in which position the bolt O engages with the opening $n'$ of the saw-shaft N, and the saw M is forced into or withdrawn from the tree by elevating or depressing the lever I.

The provision of the openings $n\ n'$, bolt O, and vibratory block P acts as a universal joint to the shaft N, and thus enables the saw to be operated in either a vertical or horizontal position, as may be desired, the changing of the machine being effected in a few minutes.

The saw-shaft N can be released from the shiftable rest L by disconnecting the post D from the block G and turning said post around to the position indicated by dotted lines in Fig. 2.

We claim herein as new and of our invention—

The arrangement of the guide R, rocking block P, reversible saw-shaft N, and reversible frame D E F, when constructed as and for the purposes set forth.

In testimony of which invention we hereunto set our hands.

CHARLES R. WARNER.
MOSES BALES.

Witnesses:
GEO. H. KNIGHT,
H. W. BAIL.